United States Patent
Dalal et al.

(10) Patent No.: US 12,237,710 B2
(45) Date of Patent: Feb. 25, 2025

(54) METHOD OF CHARGING AN ENERGY STORAGE ELEMENT

(71) Applicant: SIGNIFY HOLDING B.V., Eindhoven (NL)

(72) Inventors: Sumit Dalal, Ghaziabad (IN); Manoj Kumar, Meerut (IN); Mukesh Kumar, Noida (IN); Debasish Mukherjee, New Delhi (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 58 days.

(21) Appl. No.: 18/014,995

(22) PCT Filed: Jul. 13, 2021

(86) PCT No.: PCT/EP2021/069409
§ 371 (c)(1),
(2) Date: Jan. 6, 2023

(87) PCT Pub. No.: WO2022/013192
PCT Pub. Date: Jan. 20, 2022

(65) Prior Publication Data
US 2023/0261509 A1    Aug. 17, 2023

(30) Foreign Application Priority Data

Jul. 17, 2020   (IN) .............................. 202041030599
Aug. 31, 2020   (EP) ...................................... 20193521

(51) Int. Cl.
*H02J 7/35* (2006.01)
*H02J 7/00* (2006.01)

(52) U.S. Cl.
CPC ............ *H02J 7/35* (2013.01); *H02J 7/00032* (2020.01); *H02J 7/0024* (2013.01); *H02J 7/0048* (2020.01); *H02J 7/007* (2013.01)

(58) Field of Classification Search
CPC ........ H02J 7/35; H02J 7/00032; H02J 7/0024; H02J 7/0048; H02J 7/007; H02J 2300/22
See application file for complete search history.

(56) References Cited

U.S. PATENT DOCUMENTS

| | | | |
|---|---|---|---|
| 2010/0231162 A1* | 9/2010 | Gibson ..................... | B60L 8/00 320/101 |
| 2012/0169269 A1* | 7/2012 | Liu ........................... | H02J 7/35 320/101 |

(Continued)

FOREIGN PATENT DOCUMENTS

| | | |
|---|---|---|
| CN | 102111088 A | 6/2011 |
| EP | 2685590 A2 | 1/2014 |

(Continued)

*Primary Examiner* — Lincoln D Donovan
*Assistant Examiner* — Alex W Lam

(57) ABSTRACT

A method of charging an energy storage element; wherein the energy storage element comprises a plurality of energy storage units arranged for storing electrical energy; wherein the method comprises: determining a voltage of each of the plurality of energy storage units; determining a state-of-the-charge, SoC, of each of the plurality of energy storage units; determining a maximum power voltage, Vmp, of a solar power source; selecting (one or more) energy storage units of the plurality of energy storage units to form a charging set comprising a series and/or a parallel combination of the selected (one or more) energy storage units; wherein the selection is based on the determined maximum power voltage, Vmp, and on a first time period and a second time period associated with a first sun irradiance level and a second sun irradiance level respectively.

14 Claims, 6 Drawing Sheets

(56) References Cited

U.S. PATENT DOCUMENTS

2013/0212410 A1* 8/2013 Li .......................... G06F 1/263
                                                        713/300
2016/0043579 A1* 2/2016 Finberg ................ H02J 7/0016
                                                        320/116

FOREIGN PATENT DOCUMENTS

| JP | 2004254499 | A  | 9/2004  |
|----|------------|----|---------|
| WO | 2015092441 | A2 | 6/2015  |
| WO | 2018057771 | A1 | 3/2018  |
| WO | 2018219843 | A1 | 12/2018 |
| WO | 2019141565 | A1 | 7/2019  |

* cited by examiner

METHOD OF CHARGING AN ENERGY STORAGE ELEMENT

CROSS-REFERENCE TO PRIOR APPLICATIONS

This application is the U.S. National Phase application under 35 U.S.C. § 371 of International Application No. PCT/EP2021/069409, filed on Jul. 13, 2021, which claims the benefit of Indian Patent Application No. 202041030599, filed on Jul. 17, 2020 and European Patent Application No. 20193521.0, filed on Aug. 31, 2020. These applications are hereby incorporated by reference herein.

FIELD OF THE INVENTION

The invention relates to a method of charging an energy storage element. The invention further relates to a system and a computer program product for charging an energy storage element.

BACKGROUND

The ability to access electricity is a crucial factor in both the overall economic growth of a country and the overall quality of life of its inhabitants. In most parts of the world, areas without electricity are far less developed than areas with electricity. In areas with limited conventional energy reserves, rising demand for power coupled with inadequate power generation has made providing reliable electrical power without frequent disruption a major challenge.

In order to address the issue of providing reliable power and to tackle the challenge of climate change, there is an increasing focus on enhancing the use of renewable energy sources such as solar energy. The high levels of solar insolation in some countries, and inability to meet the demand for electricity through conventional energy sources due to, for example, inadequate power generation, has encouraged local governments to promote schemes such as solar street lighting and solar rooftop photovoltaic (PV) systems. This has made PV systems increasingly popular. When there is no solar insolation, such as nighttime, a charged battery, which is charged via the solar energy in the daytime, can provide power to DC loads such as DC Bulbs/Battens and DC Fan etc.

SUMMARY OF THE INVENTION

The inventors have realized that sun irradiance is not uniform throughout the daytime and the time period to extract the peak energy from a solar power source, based on a daily sun energy profile, is limited. Furthermore, the solar energy also varies depending on geographic locations, weather, seasons of the year etc.

It is therefore an object of the present invention to extract maximum energy available from the solar power source, specifically during the peak hours of sun insolation.

According to a first aspect, the object is achieved by a method of charging an energy storage element; wherein the energy storage element comprises a plurality of energy storage units arranged for storing electrical energy; wherein the method comprises: determining a voltage of each of the plurality of energy storage units; determining a state-of-the-charge, SoC, of each of the plurality of energy storage units; determining a maximum power voltage, Vmp, of a solar power source; selecting (one or more) energy storage units of the plurality of energy storage units to form a charging set comprising a series and/or a parallel combination of the selected (one or more) energy storage units; wherein the selection is based on the determined maximum power voltage, Vmp, and on a first and a second time period associated with a first and a second sun irradiance level respectively; wherein the selection is further based on a predetermined voltage and state-of-the-charge corresponding to the first and the second time period respectively; controlling one or more switches of the energy storage element to form the charging set; and providing power from the solar power source via a solar power converter to the charging set.

The method comprises determining a voltage of each of the plurality of energy storage units. The energy storage element may be a rechargeable battery such as a Lithium Iron Phosphate (LFP) battery, a Lithium-Ion battery or a Nickel-based battery, wherein the plurality of energy storage units may comprise individual battery cells. The method further comprises determining a state-of-the-charge, SoC, of each of the plurality of energy storage units. For example, the state-of-the-charge may be estimated based on a measurement of voltage drop and current of the energy storage units. The method further comprises determining a maximum power voltage, Vmp, of a solar power source. Maximum power can be extracted from a solar power source when it operates close to the maximum power voltage, Vmp. Or in other words, maximum power voltage, Vmp, is the Voltage of the solar power source when the solar power source is delivering maximum power. The solar power source may be a Photovoltaic (PV) module.

The method further comprises selecting (one or more) energy storage units of the plurality of energy storage units to form a charging set comprising a series and/or a parallel combination of the selected (one or more) energy storage units. In a simple example, the charging set may comprise a single energy storage unit. In an example, more than one energy storage units are selected to form a charging set. The more than one energy storage units may be arranged in series and/or parallel combination. In a series combination, a set voltage of the charging set is a summation of the voltages of the selected (one or more) energy storage units. In a parallel combination, an inverse of the set voltage of the charging set is a summation of inverse of the voltages of the selected (one or more) energy storage units. A hybrid of series and parallel combination of energy storage units may also be included in the charging set.

The selection step comprises selection criteria to select one or more energy storage units to form the charging set. The selection may be based on the determined maximum power voltage, Vmp. The charging set is formed such that a difference between the set voltage of the charging set and the maximum power voltage, Vmp, is minimized. The selection may be dynamic, for instance, the charging set is dynamically adapted, to track a maximum power point (e.g. by following Vmp). The selection may be based on a first time period and a second time period associated with a first sun irradiance level and a second sun irradiance level respectively, wherein the selection is further based on a predetermined voltage and state-of-the-charge corresponding to the first and the second time period respectively. The selection criteria may further comprise selecting (one or more) energy storage units having a predetermined voltage and state-of-the-charge. The predetermined voltage and state-of-the-charge is defined for the first and the second time period respectively, such that, in an example, a different voltage and state-of-the-charge is defined for the first and the second time period.

One or more switches are then controlled to form such a charging set and power is then provided from the solar power source via a solar power converter for charging the charging set. Since, the (one or more) energy storage units are selected based on selection criteria such as Vmp, predetermined voltage and state-of-the-charge for different sun irradiance levels (time periods), maximum energy available from the solar power source is extracted, specifically during the peak hours of sun insolation. Furthermore, an improved method for charging the energy storage element is achieved.

In an embodiment, the first sun irradiance level is higher than the second sun irradiance level, and wherein the method may further comprise: assigning, for the first time period, a higher weight to the voltage compared to the state-of-the-charge; and assigning, for the second time period, a higher weight to the state-of-the-charge compared to the voltage.

In an example, the first time period which corresponds to the first sun irradiance level may comprise the peak hours of sun insolation, e.g. noon time. The second time period which corresponds to the second sun irradiance level may comprise non-peak hours of sun insolation, e.g. morning time or afternoon time. The time period may be different for different geographical locations based on sun insolation, weather conditions etc.

In this embodiment, as a selection criterion, voltage of the energy storage units is advantageously assigned higher weight for the first time period (with high sun irradiance) such that a better tracking of maximum power point is achieved. Therefore, during peak hours, the voltage matching of Vmp and the set voltage is preferred to extract maximum power. During non-peak hours, when the energy from the solar power source is low, such as morning or afternoon, state-of-the-charge (maintenance) is a preferred selection criterion for a better energy storage element management.

In an embodiment, the method may further comprise: determining a set voltage of the charging set; determining a difference between the determined set voltage of the charging set and the determined maximum power voltage, Vmp; wherein when the difference exceeds a threshold: adapting the charging set in order to minimize the difference; wherein the adapting of the charging set comprises changing the number of the energy storage units in the charging set and/or adapting the series and/or parallel combination of the energy storage units; providing power from the solar power source via the solar power converter to the adapted charging set.

In this embodiment, the charging set is dynamically adjusted to track the maximum power point (e.g. by following Vmp). The dynamic adjustment may comprise adding/removing energy storage units from the charging set based on the difference between the set voltage and the Vmp. The addition/removal of the selected (one or more) energy storage units may be based on the selection criteria as highlighted before. Additionally, and/or alternatively, the adaption may comprise changing the series/parallel combination of the energy storage units to change the set voltage of the charging set.

In an embodiment, the energy storage element may further comprise a communication interface arranged for receiving a communication signal from the solar power converter; wherein the communication signal may be indicative of the determined difference between the set voltage of the charging set and the maximum power voltage, Vmp. In an embodiment, the communication signal may comprise a command signal for adapting or maintaining the charging set based on the determined difference.

The energy storage element may receive a communication signal, e.g. from the solar power converter, via a communication interface. The communication signal may comprise a signal to indicate a change required in the charging set in order to track the maximum power point. In an embodiment, the communication may be wired communication. Additionally, and/or alternatively, the communication may be a wireless communication.

In an embodiment, the solar power converter may be a PWM controller.

A solar power converter is arranged for receiving solar power from a solar power source and providing at least a part of the received solar power to the energy storage element. In this embodiment, the solar power converter is a PWM controller. Alternatively, the solar power converter may be a maximum power point tracking system such as a MPPT convertor. Unlike, MPPT converter, PWM controller uses a simple control circuit, but with a reduced power extraction efficiency. In this embodiment, the energy storage element may act as an emulated load to the PWM controller such that the overall efficiency of solar power extraction while still achieving the simplicity of the PWM controller.

In an embodiment, the energy storage element may further comprise a charging controller; wherein the charging controller may be arranged for controlling the one or more switches to form the charging set.

The energy storage element may comprise a charging controller. For example, the energy storage element may comprise an energy storage element management system, e.g. a battery management system (BMS). The controller, e.g. BMS, may determine the voltage of each of the plurality of energy storage units, estimate the state-of-the-charge of each of the plurality of energy storage units, current of a series string of energy storage units & temperature of the energy storage element and based on that it takes care of all type of protections of energy storage element like-over-voltage, over current, over temperature, under voltage cut etc. The charging controller may control the one or more switches to form the charging set.

In an embodiment, the energy storage element may be arranged for providing power to one or more load devices. In an embodiment, the one or more load devices may comprise lighting devices to illuminate an environment; and wherein the energy storage element may be arranged for providing power to the lighting devices to illuminate the environment.

In this embodiment, the one or more load devices may be arranged for receiving power from the energy storage element. For example, the energy storage elements are charged during the daytime and discharge to provide power to the one or more load devices at night. The one or more load devices may be lighting devices to illuminate an environment, e.g. indoor lams, outdoor streetlights etc. Other examples of one or more load devices may be DC fans, and other low-powered DC devices.

In an embodiment, the selected one or more energy storage units may be arranged for charging remaining one or more energy storage units of the plurality of energy storage units which are not comprised in the charging set.

For an energy storage element such as a rechargeable battery, a battery balancing and battery redistribution refer to techniques that improve the available capacity of a battery pack with multiple energy storage units such as battery cells (usually in series) and increase each cell's longevity. In this embodiment, cell balancing is achieved by charging the remaining one or more energy storage units of the plurality of energy storage units which are not comprised in the charging via the energy storage units which are a part of the charging set. The remaining energy storage units may be charged after the afternoon time, when the sun insolation is very low, and before the evening time, when the energy storage element has not yet started delivering power (discharging) to the one or more load devices.

According to a second aspect, the object is achieved by an energy storage element comprising: a plurality of energy storage units arranged for storing electrical energy; a communication interface arranged for receiving a communication signal; one or more switches arranged for configuring the plurality of energy storage units in series and/or in parallel combination; and a charging controller arranged for controlling the one or more switches to form a charging set comprising the series and/or parallel combination of one or more energy storage units of the plurality of energy storage units.

According to a third aspect, the object is achieved by a solar power converter for charging an energy storage element, comprising: a processing unit for controlling the transfer of power from a solar power source to the energy storage element; a power input interface arranged for receiving solar power from a solar power source; a power output interface arranged for providing at least a part of the received solar power to the energy storage element; a first sensing means arranged for determining a maximum power voltage, Vmp, of the solar power source; and a communication output interface arranged for providing a communication signal to the energy storage element. The solar power converter may further comprise a second sensing means arranged for determining a voltage of each of the energy storage units. Alternatively, the charging controller of the energy storage element may determine the voltage of the energy storage units and the solar power converter may receive information indicative of the determined voltage from the charging controller.

According to a fourth aspect, the object is achieved by a system for charging an energy storage element, comprising: a solar power converter arranged for receiving solar power from a solar power source and providing at least a part of the received solar power to an energy storage element according to the third aspect; and the energy storage element according to the second aspect. In an embodiment, the system further comprises: the solar power source; and one or more load devices.

According to a fifth aspect, a computer program product comprising instructions which, when the program is executed by a computer, cause the computer to carry out the steps of the method according to the first aspect.

It should be understood that the computer program product and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
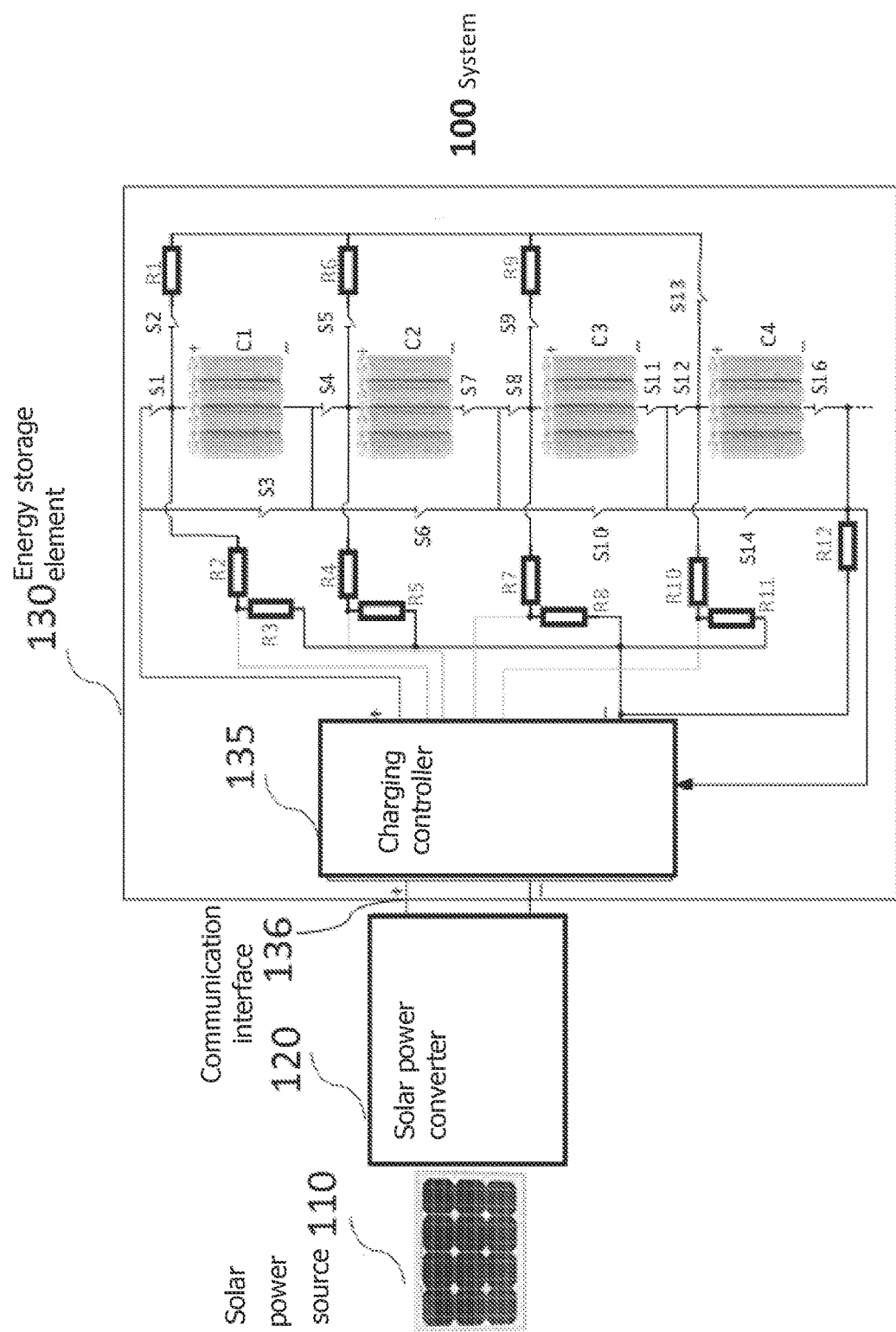
FIG. 1 shows schematically and exemplary an embodiment of a system for charging an energy storage element.

FIG. 1 shows schematically and exemplary an embodiment of a system 100 for charging an energy storage element 130. The system 100 may comprise a solar power source 110. In an example, when the solar power source 110 may comprises a Photovoltaic (PV) system. For example, the PV system comprises a 20-150 W rating, in a suitable condition of sun insolation, the PV may provide approx. 100 Wh-750 Wh. The system 100 may further comprise a solar power converter 120. The solar power converter 120 may be arranged for receiving solar power of the solar power source 110 and transfer at least a part of the received solar power to an energy storage element 130. In an example, the solar power converter 120 is a maximum power point tracking (MPPT) system. In an alternative example, the solar power converter 120 is a PWM controller.

The system 100 further comprises an energy storage element 130. The energy storage element 130 may be arranged for storing electrical energy. The energy storage element 130 may for example be a capacitor, such as an electrolytic capacitor, or supercapacitor, or an array of capacitors, flywheel and/or batteries. The energy storage element may be a rechargeable battery such as a Lithium Iron Phosphate (LFP) battery, a Lithium-Ion battery or a Nickel-based battery. The energy storage element 130 may comprise a rechargeable 12.8V/l0 Ah-30 Ah battery. The energy storage element 130 may comprise a plurality of energy storage units C1-C4. In this exemplary figure, only four energy storage units C1-C4 are shown. The energy storage element 130 may have any number of energy storage units C1-C4. For (rechargeable) batteries, the plurality of energy storage units C1-C4 may comprise individual battery cells. The energy storage element 130 may further comprise one or more switches S1-S16 arranged for forming a charging set, wherein the charging set comprises a series and/or a parallel combination of the plurality of electrical storage units C1-C4. These one or more switches S1-S16 may, for example, comprise transistor switches such as MOSFETs. The energy storage element 130 may further comprise a set of resistors R1-R12, may be arranged for voltage sensing of the respective energy storage units C1-C4. The resistors R1, R6 and R9 may be arranged as current limiting resistors between each respective energy storage units during cell balancing. The resistor R12 may be arranged as current sense resistor for measuring the current of energy storage units C1-C4 during charging for SOC.

The energy storage element 130 may further comprise a charging controller 135. The charging controller 135 may comprise a battery management system (BMS) or protection circuit module or board (PCM). The charging controller 135 may be arranged for controlling the one or more switching S1-S16 to form a charging set. In a simple implementation embodiment, the charging controller 135 may be a microcontroller. The charging controller 135 may be arranged for monitoring and/or controlling the operation of the energy storage element 135 (e.g. forming charging set, determining voltage and/or SoC of the plurality of energy storage units C1-C4 etc.). The energy storage element 130 may further comprise a communication interface 136 arranged for receiving a communication signal from the solar power converter 120, wherein the communication signal is indicative of the determined difference between the set voltage of the charging set and the maximum power voltage, Vmp. In an example, the communication signal comprises a command signal for adapting or maintaining the charging set based on the determined difference. The charging controller 135 may be arranged for controlling the communication with the solar power converter 120 via the communication interface.

The system 100 may comprise the one or more load devices (not shown). The system 100 may comprise any number of load devices. In an example, the load devices may be lighting devices and wherein the charging controller 135 and/or the PWM controller 120 may be arranged for controlling the energy storage element 130 to provide power to the lighting devices to illuminate an environment. The charging controller 135 and/or the PWM controller 120 may also be arranged for controlling the lighting devices to illuminate the environment. The charging controller 135 and/or the PWM controller 120 may be arranged for controlling color, color temperature, intensity, beam width, beam direction, illumination intensity, and/or other parameters of one or more of light sources of the lighting devices. In an example, the load devices may be sensing or actuating devices. The sensing devices may include presence sensors for detecting the presence of persons, temperature sensors, light sensors, humidity sensors, gas sensors etc.

The charging controller 135 and the PWM controller 120 may be implemented in a unit separate from the energy storage element 130 and solar power converter 120, respectively, such as separate dedicated circuit. Alternatively, the charging controller 135 and/or the PWM controller 120 may be incorporated into the same unit as the energy storage element 130 and the solar power converter 120, respectively. The charging controller 135 and/or the PWM controller 120 may be implemented in a single unit or in the form of distributed functionality distributed amongst multiple separate units. Furthermore, the charging controller 135 and/or the PWM controller 120 may be implemented in the form of software stored on a memory (comprising one or more memory devices) and arranged for execution on a processor (comprising one or more processing units), or the charging controller 135 and/or the PWM controller 120 may be implemented in the form of dedicated hardware circuitry, or configurable or reconfigurable circuitry such as a PGA or FPGA, or any combination of these.

Regarding the various communication involved in implementing the functionality, to enable the solar power converter 120 to receive power from the solar power source 110, and furthermore to communicated and/or control the energy storage element 130 and the light output of the lighting devices, these may be implemented in by any suitable wired means, e.g. by means of a wired network such as an Ethernet network, a DMX network etc.

Figure 2:
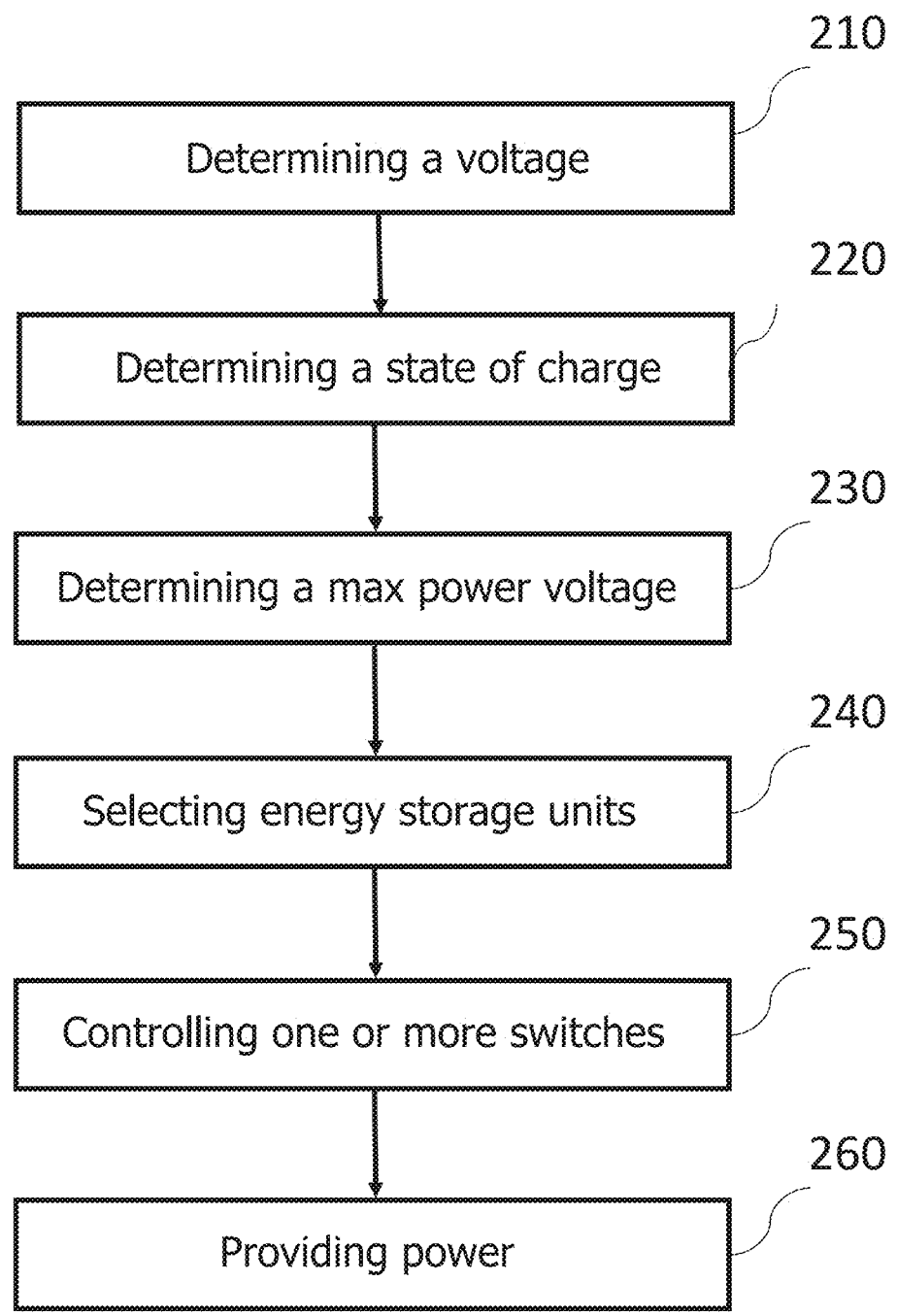
FIG. 2 shows schematically and exemplary a flowchart illustrating an embodiment of a method for charging an energy storage element.

FIG. 2 shows schematically and exemplary a flowchart illustrating an embodiment of a method 200 for charging an energy storage element 130. The energy storage element 130 comprises a plurality of energy storage units C1-C4 arranged for storing electrical energy. The method 200 may comprise determining 210 a voltage of each of the plurality of energy storage units. For example, for an LFP (Lifepo4) battery, the energy storage unit's voltage ranges in between 2.6V to 3.7V with a typical voltage of approximately 3.2V and store maximum energy (Ah) in 2.8V to 3.5V range. A charging controller 135 may be used to measure a voltage drop across each of the plurality of energy storage units to determine the voltage. For example, the voltage may be determined using resistors R2, R3, R4, R5, R7, R8, R10 & R11. Additionally, and/or alternatively, the voltage may be determine 210 directly based on ADC based measurements, using operational amplifiers and/or using resistor divider. Any other method of determining voltage of the energy storage units C1-C4, known in the art, is not excluded. The method 200 may further comprise determining 220 a state-of-the-charge, SoC, of each of the plurality of energy storage units C1-C4. The state-of-the-charge, SoC, may be defined as the ratio of an available capacity Q(t) and the maximum possible charge that can be stored in a battery, i.e., the nominal capacity Qn. The state-of-the-charge, SoC, may be determined by measuring/sensing the voltage and the current at the energy storage unit C1-C4. The state-of-the-charge may be estimated based on the measured/sensed voltage and current. 2. Additionally, and/or alternatively, the SoC may be determine 220 based on voltage measurement, coulomb counting or current integration and/or battery Watt hour/Voltage. Any other method of determining SoC, known in the art, is not excluded. The charging controller 135 may be arranged for determining the voltage and SoC of the energy storage units. Additionally, and/or alternatively, the solar power converter 120 may be arranged for determining the voltage and SoC of the energy storage units.

The method 200 may further comprise determining 230 a maximum power voltage, Vmp, of a solar power source 110. Maximum power may be extracted from the solar power source 110 when the solar power source is 110 is operating close to the maximum power voltage, Vmp. In an example, the solar power converter 120 is arranged for determining the maximum power voltage, Vmp.

The method 200 may further comprise selecting 240 (one or more) energy storage units of the plurality of energy storage units C1-C4 to form a charging set comprising a series and/or a parallel combination of the selected one or more energy storage units C1-C4. The selection 240 may be based on some predefined selection criteria. These selection criteria may be defined to extract maximum power from the solar power source 110 (energy storage element 130 voltage maintenance) and to keep charge balancing for the plurality of energy storage units C1-C4 (state-of-the-charge maintenance). The SoC maintenance may be based, e.g. on the chemistry of the energy storage element 130. The first selection criterion is that the selection 240 may be based on determined maximum power voltage, Vmp. To extract maximum power, the voltage of the energy storage element 130 must be as close as possible to the maximum power voltage, Vmp. The (one or more) energy storage units C1-C4 are selected to minimize the difference between the set voltage of the charging set/energy storage element 130 and the maximum power voltage, Vmp. The selection 240 may be performed by a charging controller of the energy storage element or by the solar power converter.

The second related selection criterion is based on the sun irradiance level. The selection 240 may be based on a first and a second time period associated with a first and a second sun irradiance level respectively. Furthermore, the selection may be based on a predetermined voltage and state-of-the-charge corresponding to the first and the second time period respectively. In an embodiment, the first sun irradiance level is higher than the second sun irradiance level. As sun irradiance varies over time, the sun irradiance level may be defined as a range of sun irradiance values (measured e.g. in power per unit area, W/m^2). The first and the second sun irradiance level may be non-overlapping such that the minimum value of the first sun irradiance range is higher than the maximum value of second sun irradiance level. The first and the second sun irradiance level may be partly overlapping. In an alternate example, the first and the second sun irradiance level may be a value being above or below a threshold. In an example, the first and the second time period may be determined based on sun irradiance level.

Figure 4:
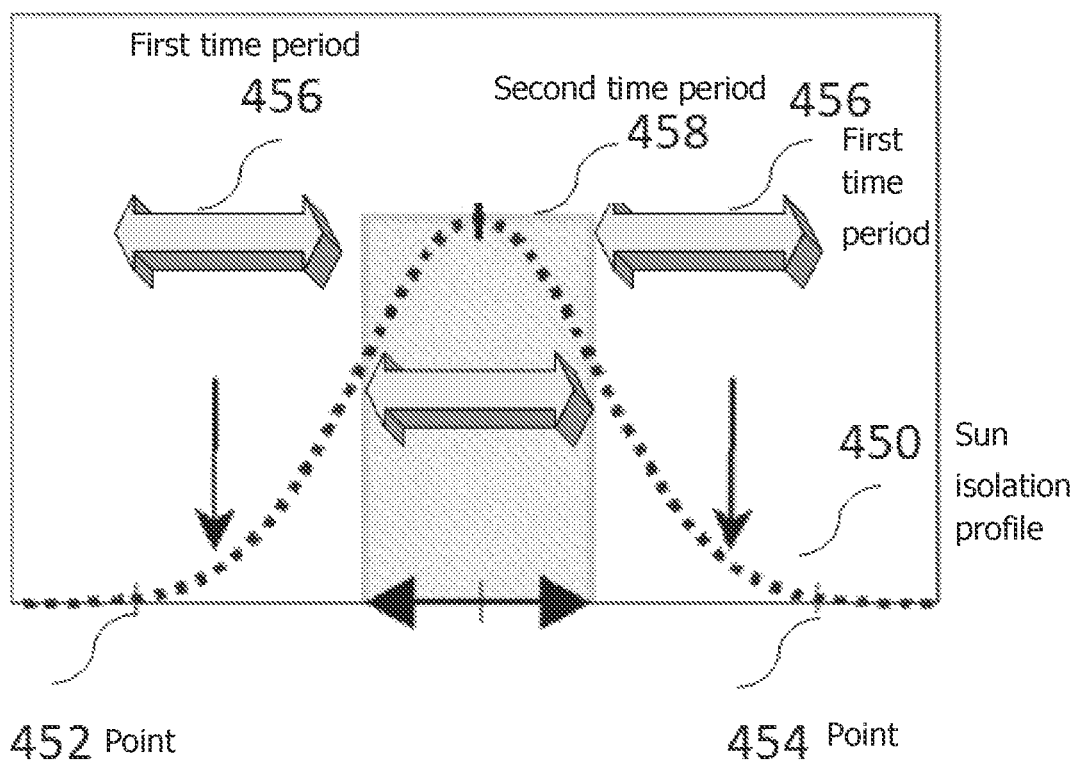
FIG. 4 shows exemplary a daily sun insolation profile.

Now referring to FIG. 4 which shows exemplary a daily sun insolation profile 450. The sun insolation may further depend upon geographical locations, weather condition, seasons of the year etc. The point 452 and 454 of the sun insolation profile curve 450 exemplary represent sunrise and sunset, respectively. The sun insolation gradually increases over time after the sunrise. The sun profile may be divided at least into the first time period 456 and the second time period 458. The first 456 and the second 458 time period are associated with the first sun irradiance level and the second sun irradiance level respectively. For example, the first time period 456 may be defined for the low sunlight intensity period such as the morning/afternoon time, and the second time period 458 may be defined for the high sunlight intensity period such as noon time. As an example, the peak sunlight period may comprise 5.5 sun peak hours. During the first time period, such as noon peak sun insolation hours, the sun irradiance is higher compared to the second time period, such as morning/afternoon non-peak sun insolation hours.

Now referring back to FIG. 2, the selection criteria may further comprise assigning weights to the predetermined voltage and the state-of-the-charge. For example, during the first time period, as the sun irradiance is high, a higher weight (for the selection) may be assigned to the voltage compared to the state-of-the-charge to track the maximum power point. During the second time period, a higher weight (for the selection) may be assigned to the state-of-the-charge maintenance compared to the maximum power tracking. Such that higher preference is voltage for the first time period compared to SoC and higher preference is given to SoC in the second time period compared to voltage. The selection 240 may be performed for the charging of the energy storage element 130. Table 1 summarizes the selection criteria based on the first and the second time periods.

TABLE 1

Selection criteria for selecting (one or more) energy storing units C1-C4 for forming a charging set.

| Daily Sun profile | Sunlight Intensity | Energy storage units switching to maintain MPPT point |
|---|---|---|
| First time period | Lower first sun irradiance level, e.g. in morning/afternoon or evening. | Energy storage units switching based on individual units (cell) SOC/voltage to maintain the set voltage near to Vmp voltage. Here a higher weight/priority is given on SOC maintenance over the very fine resolution of Vmp point tracking. |
| Second time period | Higher second sun irradiance level such as noon peak time Sun intensity | Energy storage units switching based on individual unit (cell) voltage and unit (cell) SOC <80% to maintain the set voltage near to Vmp voltage. This will have more priority to maintain the Vmp at the finest voltage resolution rather than SOC level maintenance. |

The method 200 may further comprise controlling 250 one or more switches S1-S16 of the energy storage element 130 to form the charging set. The charging controller 135 may be arranged for controlling the one or more switch S1-S16 to form the charging set. The method 200 may further comprise providing 260 power from the solar power source 110 via the solar power converter 120 to the charging set. The order of the steps 210-260 is exemplary shown, and a different order, especially with the steps 210-230 may be considered.

The efficiency of power transfer from the solar power source 110 typically depends on the amount of sunlight falling (sun insolation) on the solar power source 110 and the electrical characteristics of the one or more load devices (not shown). As the amount of sunlight varies, the one or more load devices characteristic that gives the highest power transfer efficiency changes, so that the efficiency of the system is optimized when the one or more load devices characteristic changes to keep the power transfer at highest efficiency. This load characteristic is called the maximum power point (MPP) and MPPT is the process of finding this point and keeping the load characteristic there. Electrical circuits, such as MPPT solar power converter, can be designed to present arbitrary loads to the solar power source and then convert the voltage, current, or frequency to suit other devices or systems, and MPPT solves the problem of choosing the best load to be presented to the solar cells in order to get the most usable power out. MPPT solar power converter system may comprise a microcontroller (not shown) for sensing voltage and current input, a PWM circuitry (not shown) and a DC/DC buck converter (not shown). MPPT system provides high solar power extraction efficiency but requires complex circuitry such as a DC-DC converter which also increases the cost and form factor. The magnetic components in MPPT systems also introduces EMI/EMC.

A PWM solar power converter, on the other hand, receives power from the solar power source 110, such as PV cell and provides a part of the received voltage to an energy storage element 130, e.g. by dropping the PV voltage to the energy storage element voltage (because of direct shorting of PV to the energy storage element 130). As the energy storage element voltage is quite low as compare to Vmp level of PV, so the PWM controller is not able to extract the Vmp level of PV hence the power extraction efficiency of PWM controller is low. Therefore, the PWM controller does not extract maximum power from PV system. The PWM controller is a cost-efficient controller as it does not require DC-DC converter, and requires less components compared to MPPT systems, and it has small form factor and also has no issue of EMI/EMC. Since, a charging set of the energy storage units C1-C4 may be formed such that the difference between the set or energy storage element voltage and Vmp can be minimized, the energy storage element 130 may act as an emulated load to the solar power converter 120. For example, with PWM controller, and with the energy storage element 130 acting as an emulated load, the overall efficiency of power transfer can be increased. Such system with PWM controller and the energy storage element 130 keeps the benefits of PWM controller and increases the power transfer efficiency.

For an energy storage element such as a rechargeable battery, a battery balancing and battery redistribution refer to techniques that improve the available capacity of a battery pack with multiple energy storage units such as battery cells (usually in series) and increase each cell's longevity. For this dynamic configuration/forming of charging set, the cell balancing may be achieved by charging the remaining one of the plurality of energy storage units which are not comprised in the charging via the energy storage units which are a part of the charging set. A daytime may be divided into a charging time period (in the daytime with available sun insolation) with a peak charging time period such as a peak sun hors (noon time) and a discharging time period (in the night with charged energy storage element 130) with a peak discharging time period such as night time. The remaining energy storage units may be charged after the charging time period, or at least after the peak charging period when the charging set is sufficiently charged, and before the discharging time period, or at least before the peak discharging period. Such timing will advantageously provide regenerative cell balancing.

Figure 5:
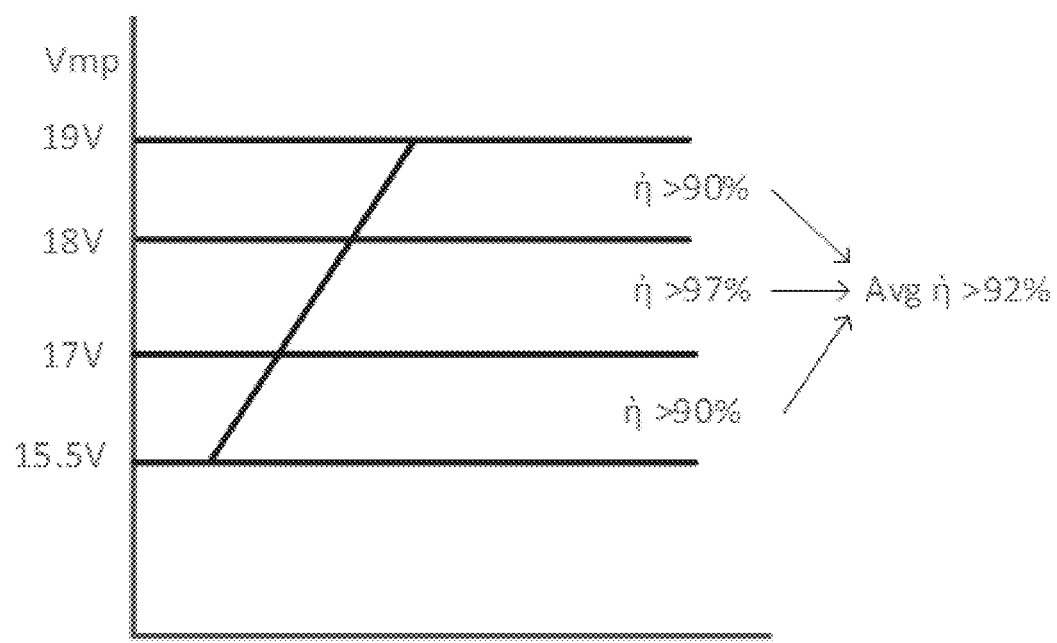
FIG. 5 shows exemplary an improvement in power transfer efficiency with PWM controller for solar power energy.

Now referring to FIG. 5 which shows exemplary an improvement in power transfer efficiency for solar power energy with PWM controller. The power transfer efficiency is improved with PWM controller and the energy storage element 130. The maximum power which can be extracted, using PWM controller, from the solar power source 110 is generally 70%, compared to the MPPT system power extraction efficiency of around 95%. FIG. 5 exemplary shows an improvement in power extraction efficiency with PWM controller and the energy storage element 130 of maximum 97% and minimum of 90%. On average, an improvement in extraction efficiency of 92% is achieved. The achieved efficiency is dependent on the selection 240 of the (one or more) energy storage units C1-C4. The power extraction efficiency may be defined as the ability of the solar power converter 120 (PWM controller) to extract the maximum available power from the solar power source 110 based on the sun energy at that time period. So, the solar power converter 120 (PWM controller) should be able to extract more power from the solar power source 110 if the sun is brighter and similarly lesser power from the solar power source 110 when the sun is low in brightness. For example, the morning and evening instances when sun brightness is low. Power conversion efficiency, on the other hand, may be defined as the loss in electronics components used in the solar power converter 120 (PWM controller) while doing the charging from the solar power source 110 to the energy storage element 130. PWM controller 120 has better power conversion efficiency because of less component count (No DC/DC Buck). So overall efficiency (extraction and power conversion) will be better than the MPPT system.

Figure 3:
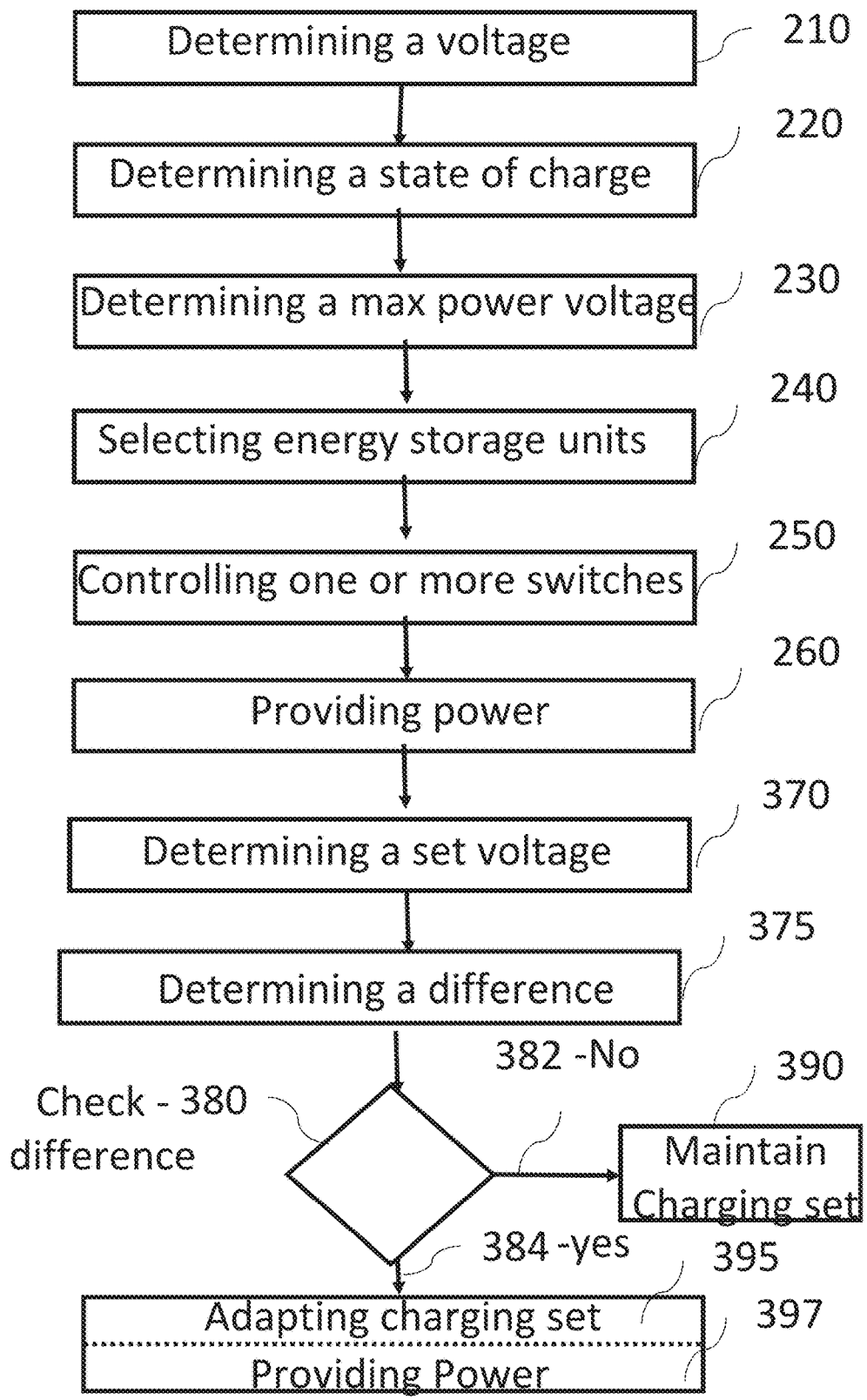
FIG. 3 shows schematically and exemplary a flowchart illustrating another embodiment of a method for charging an energy storage element.

Now referring to FIG. 3, which shows schematically and exemplary a flowchart illustrating another embodiment of a method 300 for charging an energy storage element 130. The method steps 210-260 of the method 300 are the same as previously defined method 200 of FIG. 2. Therefore, the method steps 210-260 are kept with the same numerals. The method 300 further comprises determining 370 a set voltage of the charging set. The set voltage or the voltage of the energy storage element 130 may comprise voltage of the series and/or parallel connected (one or more) energy storage units C1-C4. The charging controller 135 may be arranged for determining the set voltage. Additionally, and/or alternatively, the solar power converter 120 may be arranged for determining the set voltage. In another example, the set voltage may be determined based on the voltage of the selected individual energy storage units C1-C4 comprised in the charging set. For example, when C1-C3 each with voltage 3V, are selected to form a charging set and are connected in series, the set voltage is 9V.

The method 300 may further comprise determining 375 a difference between the determined set voltage of the charging set and the determined maximum power voltage, Vmp. The difference is important for maximum power tracking. The difference may be determined 375 by the solar power converter 120 and/or by the charging controller 135 of the energy storage element 130. The method 300 may further comprise a condition 380 to check whether the difference exceeds a threshold. When the difference exceeds a threshold (yes 384), which e.g. implies that the maximum power is not extracted from the solar power source 110, the method 300 may further comprise adapting 395 the charging set to minimize the difference (e.g. to track the maximum power point). The adapting 395 of the charging set may comprise changing the number of energy storage units C1-C4 in the charging set. The addition of the new energy storage units C1-C4 may be based on the selection criteria as discussed before. Additionally, and/or alternatively, the adapting 395 may comprise adapting the series and/or parallel combination of the energy storage units C1-C4 to change the set voltage. The method 300 may further comprise providing 397 power from the solar power source 110 via the solar power converter 120 to the adapted charging set. When the difference does not exceed the threshold, (No 382), as the maximum power is already being extracted, the method may comprise maintaining 390 the charging set.

In an example, the energy storage element 130 comprises a communication interface 136 arranged for receiving a communication signal from the solar power converter 120; wherein the communication signal is indicative of the determined difference between the set voltage of the charging set and the maximum power voltage, Vmp. In this example, the difference is determined 375 by the solar power converter 120. The communication signal may comprise a command signal for adapting 395 or maintaining 390 the charging set based on the determined difference.

Figure 6A:
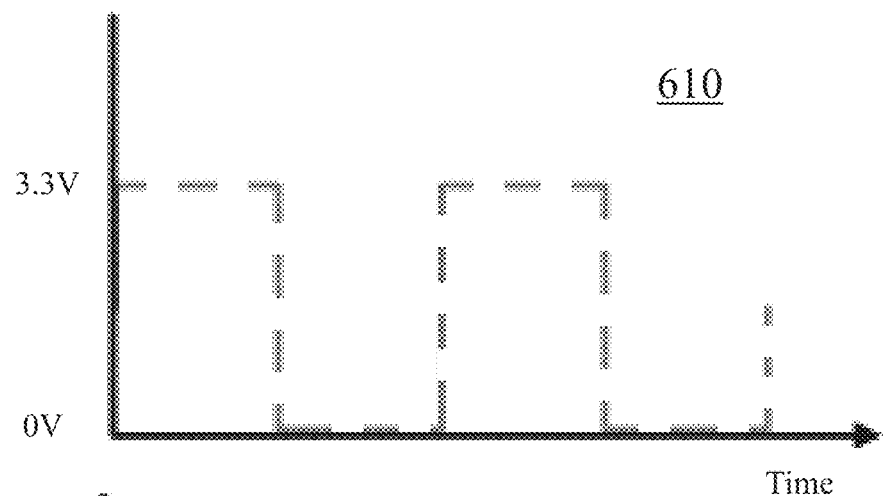
FIGS. 6a-6c shows example communication signals.
Figure 6B:
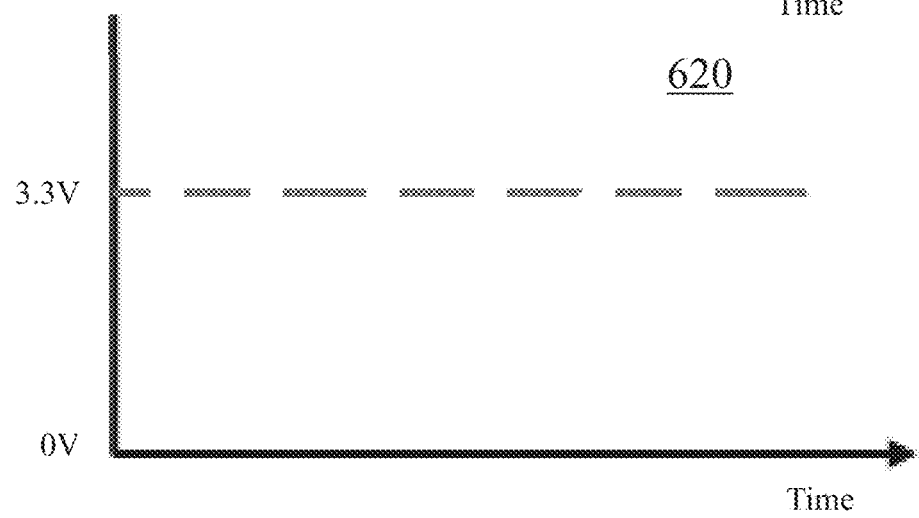
Figure 6C:
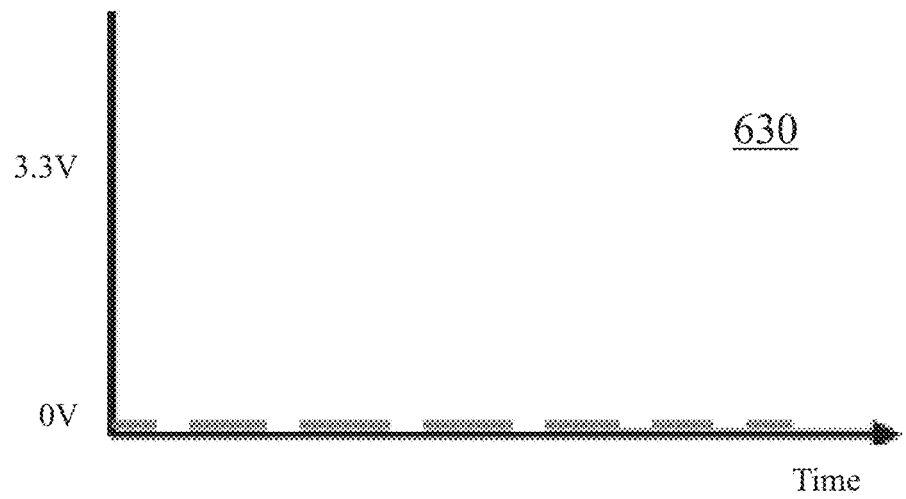

Examples of communication signal-signals are provided in FIGS. 6a-6C, which are based in these examples on a physical layer communication and discussed in Table 2 below. For example, signal 610 in FIG. 6a shows a step function signal that switches from a value of 3.3V to 0V and from 0V to 3.3V to increase the set voltage. Signal 620 in FIG. 6b shows a signal having a constant voltage of 3.3V to maintain the set voltage. Signal 630 in FIG. 6c shows a signal having a constant voltage of 0V to decrease the set voltage.

TABLE 2

Communication Signal from the solar power converter 120 (e.g. PWM controller) to the energy storage element 130.

| The signal from PWM charger | Information | Action |
|---|---|---|
| Signal 610 | Increase the set voltage | The charging controller will adapt the charging set to increase the set voltage (e.g., by adding more energy storage units) |
| Signal 620 | Maintain the set voltage | The charging controller will not take any action and will maintain the set voltage with existing configuration (series/parallel). |
| Signal 630 | Decrease the set voltage | The charging controller will adapt the charging set to decrease the set voltage (e.g., by removing energy storage units). |

The method 200-300 may be executed by computer program code of a computer program product when the computer program product is run on a processing unit of a computing device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of charging an energy storage element; wherein the energy storage element comprises a plurality of energy storage units arranged for storing electrical energy; wherein the method comprises:
    determining a voltage of each of the plurality of energy storage units;
    determining a state-of-the-charge (SoC) of each of the plurality of energy storage units;
    determining a maximum power voltage (Vmp) of a solar power source;
    selecting one or more energy storage units of the plurality of energy storage units to form a charging set comprising a series and/or a parallel combination of the selected one or more energy storage units; wherein the selection is based on the determined maximum power voltage, and on a first time period and a second time period associated with a first sun irradiance level and a second sun irradiance level respectively;
    wherein the selection is further based on a predetermined voltage and state-of-the-charge corresponding to the first and the second time period respectively;
    controlling one or more switches of the energy storage element to form the charging set; and
    providing power from the solar power source via a solar power converter to the charging set;
    wherein the first sun irradiance level is higher than the second sun irradiance level, and wherein the method further comprises:
    assigning, for the first time period, a higher weight to the voltage compared to the state-of-the-charge; and
    assigning, for the second time period, a higher weight to the state-of-the-charge compared to the voltage.

2. The method according to claim 1, wherein the method further comprises:
    determining a set voltage of the charging set;
    determining a difference between the determined set voltage of the charging set and the determined maximum power voltage (Vmp);
    wherein when the difference exceeds a threshold:
    adapting the charging set in order to minimize the difference; wherein the adapting of the charging set comprises changing the number of the energy storage units in the charging set and/or adapting the series and/or parallel combination of the energy storage units;
    providing power from the solar power source via the solar power converter to the adapted charging set.

3. The method according to claim 2; wherein the energy storage element further comprises a communication interface arranged for receiving a communication signal from the solar power converter; wherein the communication signal is indicative of the determined difference between the set voltage of the charging set and the maximum power voltage (Vmp).

4. The method according to claim 3; wherein the communication signal comprises a command signal for adapting or maintaining the charging set based on the determined difference.

5. The method according to claim 1; wherein the solar power converter is a PWM controller.

6. The method according to claim 1; wherein the energy storage element further comprises a charging controller; wherein the charging controller is arranged for controlling the one or more switches to form the charging set.

7. The method according to claim 1, wherein the energy storage element is arranged for providing power to one or more load devices.

8. The method according to claim 7, where the one or more load devices comprises lighting devices to illuminate an environment; and wherein the energy storage element is arranged for providing power to the lighting devices to illuminate the environment.

9. The method according to claim 1; wherein the selected one or more energy storage units are arranged for charging remaining one or more energy storage units of the plurality of energy storage units which are not comprised in the charging set.

10. An energy storage element comprising:
a plurality of energy storage units arranged for storing electrical energy;
a communication interface arranged for receiving a communication signal;
one or more switches arranged for configuring the plurality of energy storage units in series and/or in parallel combination; and
a charging controller arranged for controlling the or more switches to form a charging set comprising the series and/or parallel combination of one or more energy storage units of the plurality of energy storage units; wherein the one or more energy storage units of the plurality of energy storage units are selected to form a charging set comprising a series and/or a parallel combination of the selected one or more energy storage units; wherein the selection is based on a determined maximum power voltage, and on a first time period and a second time period associated with a first sun irradiance level and a second sun irradiance level respectively;
wherein the selection is further based on a predetermined voltage and state-of-the-charge corresponding to the first and the second time period respectively; and
wherein the first sun irradiance level is higher than the second sun irradiance level, and wherein
for the first time period, a higher weight is assigned to the voltage compared to the state-of-the-charge; and
for the second time period, a higher weight is assigned to the state-of-the-charge compared to the voltage.

11. A solar power converter for charging an energy storage element, wherein the energy storage element comprises a plurality of energy storage units arranged for storing electrical energy; and wherein the solar power converter comprises:

a processing unit for controlling the transfer of power from a solar power source to the energy storage element;
a power input interface arranged for receiving solar power from a solar power source;
a power output interface arranged for providing at least a part of the received solar power to the energy storage element;
a first sensing means arranged for determining a maximum power voltage (Vmp) of the solar power source; and
a communication output interface arranged for providing a communication signal to the energy storage element;
wherein the one or more energy storage units of the plurality of energy storage units are selected to form a charging set comprising a series and/or a parallel combination of the selected one or more energy storage units; wherein the selection is based on the determined maximum power voltage, and on a first time period and a second time period associated with a first sun irradiance level and a second sun irradiance level respectively;
wherein the selection is further based on a predetermined voltage and state-of-the-charge corresponding to the first and the second time period respectively; and
wherein the first sun irradiance level is higher than the second sun irradiance level, and wherein
for the first time period, a higher weight is assigned to the voltage compared to the state-of-the-charge; and
for the second time period, a higher weight is assigned to the state-of-the-charge compared to the voltage.

12. The system for charging an energy storage element, comprising:
a solar power converter arranged for receiving solar power from a solar power source and providing at least a part of the received solar power to an energy storage element according to claim 11.

13. The system according to claim 12, wherein the system further comprising:
the solar power source; and
one or more load devices.

14. A non-transitory computer readable medium comprising instructions which, when the instructions are executed by a computer, cause the computer to carry out the method of claim 1.

* * * * *